July 14, 1931.  C. R. MINER  1,814,948
AERIAL NAVIGATION MACHINE
Filed Jan. 23, 1930   8 Sheets-Sheet 1

Inventor
C. R. Miner,
By
Attorney

July 14, 1931.  C. R. MINER  1,814,948
AERIAL NAVIGATION MACHINE
Filed Jan. 23, 1930    8 Sheets-Sheet 3

July 14, 1931.  C. R. MINER  1,814,948
AERIAL NAVIGATION MACHINE
Filed Jan. 23, 1930   8 Sheets-Sheet 4

Inventor
C. R. Miner,

July 14, 1931.  C. R. MINER  1,814,948
AERIAL NAVIGATION MACHINE
Filed Jan. 23, 1930   8 Sheets-Sheet 7

Inventor
C. R. Miner,
By Mmm Hare.
Attorney

July 14, 1931.  C. R. MINER  1,814,948
AERIAL NAVIGATION MACHINE
Filed Jan. 23, 1930   8 Sheets-Sheet 8

Inventor
C. R. Miner,
By Munson K Lane.
Attorney

Patented July 14, 1931

1,814,948

UNITED STATES PATENT OFFICE

CHARLES R. MINER, OF SAN FRANCISCO, CALIFORNIA, ASSIGNOR TO AMERICAN AIRSHIP CORPORATION, OF WILMINGTON, DELAWARE

AERIAL NAVIGATION MACHINE

Application filed January 23, 1930. Serial No. 422,760.

The invention relates to improvements in aerial navigation machines, and more particularly to lighter-than-air machines or dirigible balloons of the general type illustrated in the patent granted to Harry C. Berry, No. 1,133,609, dated March 30, 1915, in which a tube or tubes pass centrally from end to end of the machine, within which tube or tubes means are provided for effecting movement of the balloon.

While the invention is primarily applicable to the device referred to above, and is illustrated in connection therewith, it will be apparent that many of the features of the invention are of more general application, and the particular embodiment herein shown is intended for the purpose of illustration.

The principal features to which the improvements are directed are, first, the box rudder or direction control mechanism. According to the present device such control mechanisms are located at each end of the dirigible at the inlet and outlet ends respectively of the central air tube or tubes. Such box rudders, according to the present invention, have a universal movement which may be readily controlled in an improved manner.

The second improvement relates to the suction producing or blower mechanisms, by means of which selective forward, rearward or downward movements of the machine are produced. According to the preferred embodiment herein illustrated, three separate blowers, each controllable from a central point or points, such as the cabins, are provided. These blowers draw air inwardly in a forward, rearward or upward direction, and are readily controlled by the operator.

A third improvement embodied in the present invention relates to means for heating the gas within the balloon to a desired temperature, producing complete circulation of such gas so as to insure uniformity, the purpose of such heating and circulation being to compensate for changes in elevation of the dirigible. By means of this arrangement, the use of sand bags may be largely eliminated, and it is also unnecessary, excepting in emergencies, to release any of the gas from the balloon to control the elevation, this being accomplished by the heating of the gases, the degree of which may be under the complete control of the operator.

The fourth improvement consists in withdrawing from the central tube a portion of the rapidly moving air and utilizing such air, which is under a certain degree of pressure, for various purposes wherein a higher degree of density is required than that of the atmosphere surrounding the balloon. For example, at high elevations compressed air may be obtained which may be utilized for breathing purposes and also for use in connection with the power plant, as for example, in cooling the moving parts or as a supply of air to the carburetors of internal combustion engines which may be used as a source of energy. Such compressed air may also be connected to a fan on the shaft of which is a dynamo producing auxiliary electrical power. Compressed air may also be used for various other purposes.

A fifth principal object of the invention is to provide means for dissipating static electricity which might otherwise tend to collect on the balloon and which might have a tendency to cause sparking or to deleteriously affect the source of electrical energy such as the dynamo or batteries. This improvement may also be used as a protection against lightning.

While the above improvements are specifically enumerated, it will be obvious from the following description that the present device possesses numerous other advantages over anything known to the prior art.

The invention will be more readily understood by reference to the accompanying drawings, which are diagrammatic in character and are intended as illustrative of the broad principles of the invention, and it will be evident that the invention is not to be limited to the details shown therein.

In the drawings,

Fig. 3 is a wiring diagram intended to show the central control of the motors which are employed for producing the various movements required in the application of the improvements to the machine;

Figure 1:
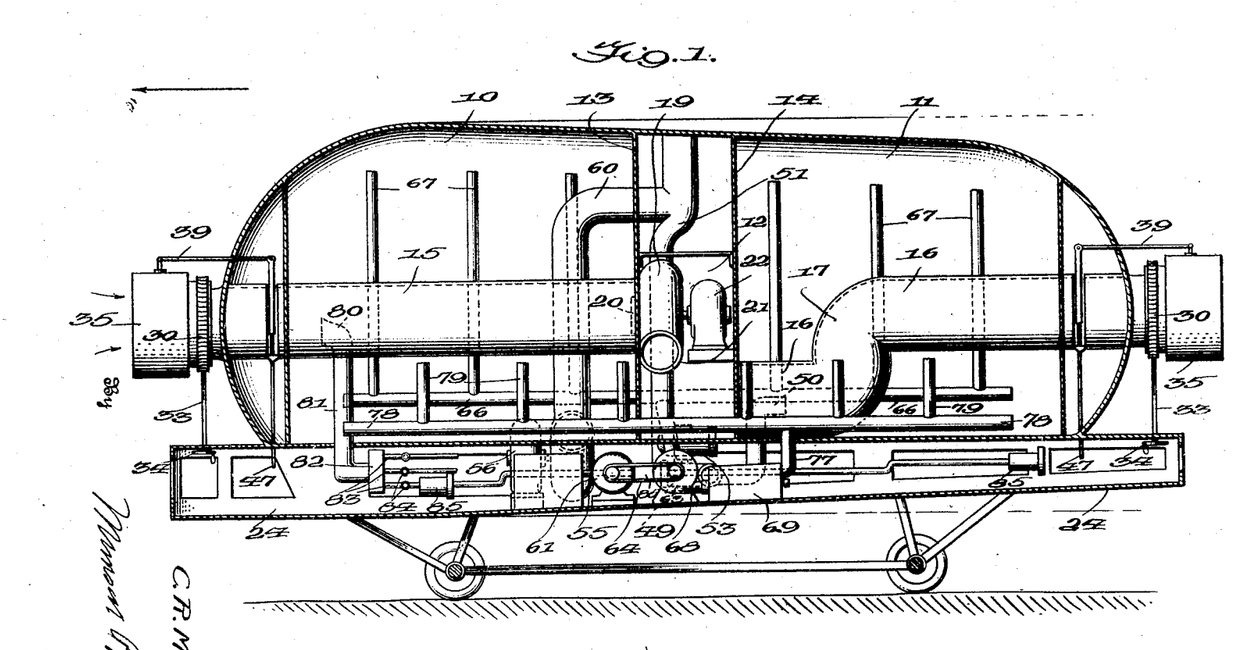
Fig. 1 is a view partly in staggered section through the balloon showing the parts in the interior of the balloon and in the cabin, as well as the box rudders in elevation, this view being intended to illustrate the application of all the improved features with the exception of the static electrical control.

In Fig. 1 the various features of my invention have been shown combined so far as possible, but as it is difficult to distinguish the operative features of the several inventions in this combined showing, the other figures of the drawings will in general be referred to for the purpose of clarity in describing particular improvements. The machine comprises in general front and rear gas bags denoted generally by the reference numerals 10 and 11. These gas bags are separated by a central chamber 12 having walls 13 and 14. A tube 15 extends longitudinally through the central portion of the gas bag 10, opening into the chamber 12. A second tube 16 extends rearwardly from the lower portion of the chamber 12 to the rear end of the gas bag 11, there being a curved portion 17 intermediate the ends of the tube 16. A suction producing fan, pump or blower 19 communicates at its inlet portion 20 with the tube 15 and discharges at 21 into the lower portion of the chamber 12, from which the air passes through pipe 16 and is discharged at the rear of the machine. This arrangement is similar to that set forth in Berry Patent No. 1,133,609, dated March 30, 1915, the purpose of the tubes 15 and 16 and the blower 19 being to produce forward movement of the balloon. The blower 19 may be operated by any suitable mechanism as the motor 22 which, as illustrated diagrammatically in Fig. 3, may be operated from any suitable source of power 23 and controlled by a switch 24 operable from any suitable location, as from the control cabin or cabins. Preferably dual control systems are provided, one at each end of the cabin 24 of the balloon. The arrangement above described is shown in Fig. 1, but is more clearly illustrated in Fig. 10, from which other features of the device have been eliminated.

Figures 6, 7:
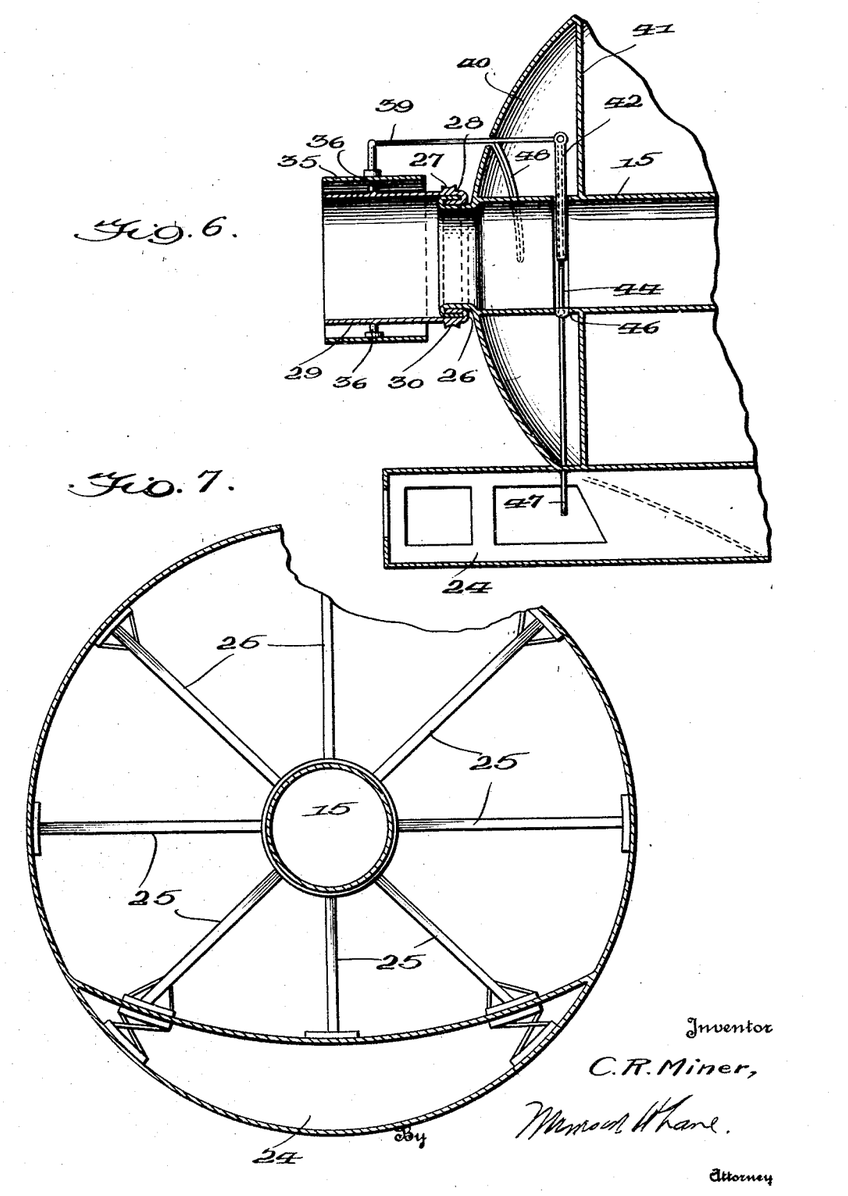
Fig. 6 is a sectional view partly broken away showing mechanism corresponding to that illustrated in Fig. 4.
Fig. 7 is a sectional view through the gas bag and through the central tube showing the means for supporting such central tube and for bracing the balloon.

As shown in Fig. 7, struts 25 are employed to support the central tube 15 and to brace the balloon so as to produce the necessary rigidity. The structural details of the device, however, are not of importance, as any suitable or well known means may be employed.

The means for controlling the direction of movement of the dirigible while in flight are most clearly illustrated in Figs. 2, 4, 5 and 6, and comprise broadly a pair of box rudders generally designated by the reference characters A and B, one mounted at each end of the balloon and adjacent the inlet and outlet respectively of the central tubes 15 and 16. These devices are similar in character and a description of one will suffice for both. It is important to note, however, that two such devices are employed, one for use when the balloon is moving in the forward direction and the other to be used when it is moving in the opposite direction, this feature being materially different from the arrangements shown in the Berry patent. It has been found that where a single control device at the forward end of the balloon is used, this is entirely ineffective when the balloon is being moved in a rearward direction, for the reason that, under such circumstances, there is no co-action between the control rudder and the expelled air, the air being shut off entirely by the balloon, and consequently no dirigible effect may be obtained. On the contrary, with the use of two rudders, complete control of the balloon when moving in either direction may be had, the rudder at the air intake end, where there is no obstruction due to the gas bag, being operated in each instance, and the rudder at the air exit end being retained in substantially fixed position.

Figures 2, 5:
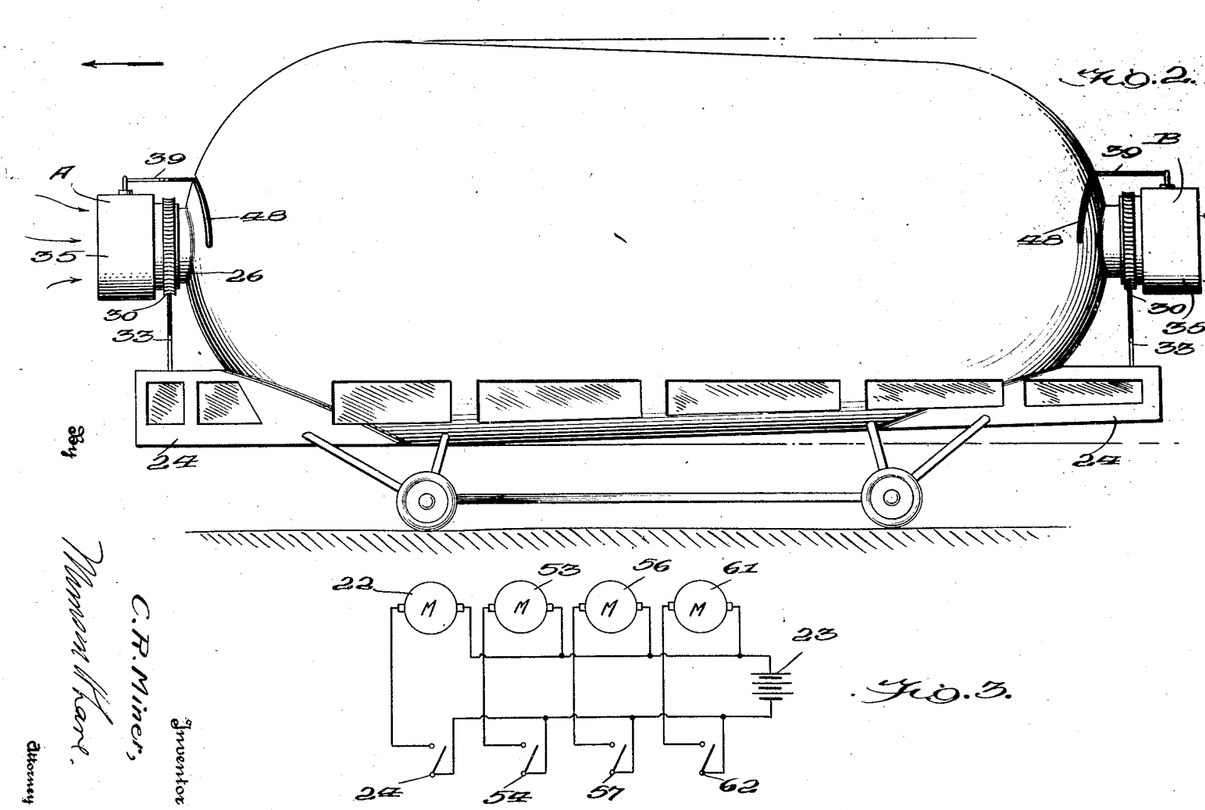
Fig. 2 is a side elevation showing the exterior of the balloon and the landing mechanism, together with the direction control means mounted on each end of the machine.
Fig. 5 is a front view partly broken away showing the box rudder and control mechanism therefor.
Figures 4, 5:
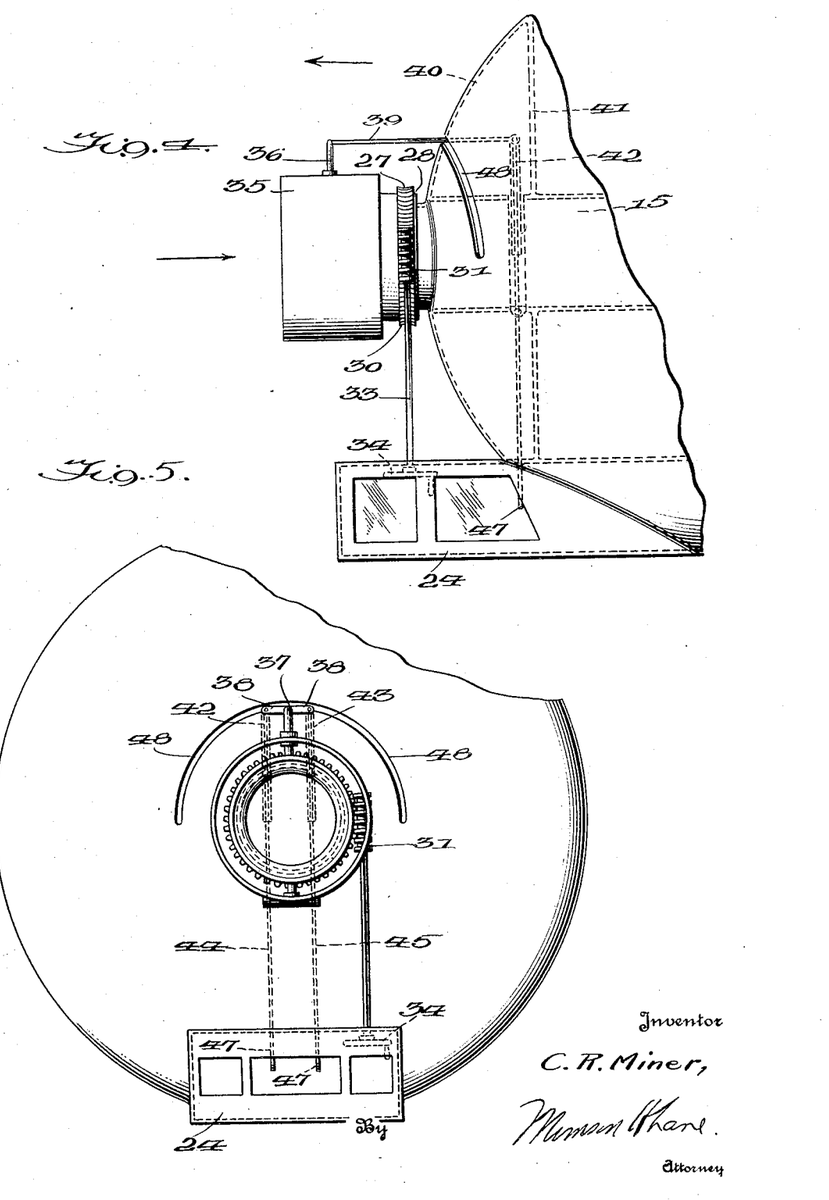
Fig. 4 is a fragmentary view in elevation showing the front end of the balloon with the box rudder applied thereto, showing also the control mechanism for such box rudder.

Referring more particularly to Figs. 4, 5 and 6, it will be noted that an extension 26 is provided at the forward end of the air tube 15, and such extension is bent over as at 27 to rotatably support a similar bent-over ring portion 28 of a sleeve 29 which extends forwardly from the member 26 and is freely rotatable thereon. A ring gear 30 is provided at the rear end of sleeve 29, and a suitable worm 31 is engageable with said gear for producing rotation of the sleeve 29. The worm 31 is operable by means of a stem 32 and hand wheel 34, which latter extends into the cabin 24. By suitable rotation of the hand wheel 34, the ring gear 30 and sleeve 29 may be caused to rotate as desired.

On the outside of sleeve 29 and suitably spaced therefrom is a collar 35 which is connected to the sleeve 29 by means of pivots 36, in such a manner that it is free to rotate for a limited distance about the axis of the pivots 36. Any suitable means for producing such movement of the collar 35 may be provided. As shown, a stem 37 extends upwardly from the upper pivot 36 and is branched at 38. Rearwardly extending from each end of the branched portion 38 are a pair of rods 39 which extend into a chamber 40 which is located in front of the gas bag 10 and separated therefrom by a wall 41. Within this chamber 40 the rods 39 are pivotally connected to a pair of downwardly extending tubular members 42 and 43. Telescoping within these members 42 and 43 and providing extensions therefor are rods 44 and 45 which are pivoted as at 46 and extend downwardly into the cabin 24, suitable handles 47 being provided for moving such rods in the directions indicated by the arrows. Slots, not shown, are provided to permit such swinging movement of the rods 44, 45 and handles 47.

By means of the arrangement described above it is possible to produce a universal movement of the collar 35 so as to direct the balloon to the right or left or up or down. Thus by moving the handle 47 in either direction, a swinging movement of the collar 35 about its pivots 36 is produced through the intermediate agency of the rods or levers 38, 39, 42 and 44. This will direct the machine either to the right or left. By turning the hand wheel 34 the worm 31 may be rotated thereby turning the sleeve 29, carrying with it the collar 35. The sleeve 29 having been thus rotated, carrying with it the collar 35, such collar may then be moved about its pivots 36 in the manner just described, thereby producing up or downward movement of the balloon. A slot 48 is provided at the forward end of the balloon to accommodate movement of the rearwardly extending rods 39. Likewise the telescopic connection between the rods 44, 45 and tubular members 42 permits this adjustment of the sleeve 29 and of the collar 35. A mechanism similar to that just described is provided at the rear end of the balloon.

Obviously other specific means for producing universal movement of the box rudder may be employed. For example, pins extending from the sides of the collar 35 may be controlled by ropes or wires extending rearwardly and passing over pulleys, and thence passing downwardly into the cabin, such means being intended to produce right or left swinging movement of the collar 35. The important feature, in any event, is the control of the box rudder so as to produce movement in any direction.

Figure 8:
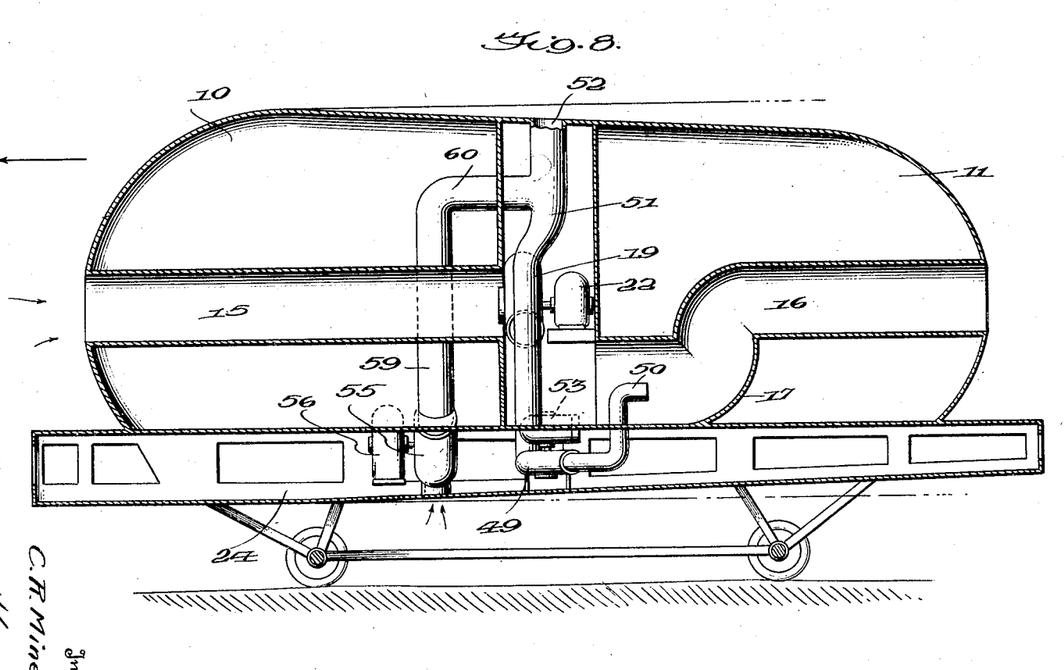
Fig. 8 is a view similar to Fig. 1, but illustrating only the suction producing device for producing movement of the balloon downward or forward or backward, the other mechanism having been removed for the purpose of clarity.

In Fig. 8 means is shown for moving the balloon selectively forwardly, rearwardly or downwardly. The means for producing forward movement is the fan or blower 19, and the motor 22, already described. To produce rearward movement, a fan or blower 49 is employed having an intake 50 extending into the curved portion 17 of the tube 16. This fan produces a suction within the pipe 16 which draws the balloon in a direction opposite to that effected by the fan 19. The fan 49 discharges through an upwardly extending pipe 51 which has an outlet 52 extending through the top of the balloon. The fan or blower may be operated in any suitable manner, as by motor 53, which as indicated in the wiring diagram shown in Fig. 3 may be operated from a source of power 23 and controlled by a central switch 54 operable from within the cabin.

To produce downward movement of the balloon, a third fan 55 is employed which may be suitably actuated by a motor 56 similar to the motors 22 and 53, and selectively controlled by a switch 57 within the cabin, as shown in Fig. 3. The fan 55 has an intake opening 58 below the cabin 24, and discharges through pipe 59 leading upwardly and branched as at 60, which branch extends into the pipe 51, and discharging through the outlet 52 at the top of the balloon. When air is drawn through the inlet 58, suction is produced which draws the balloon in a downward direction. By selectively controlling the motors 22, 53 and 56, the movement of the balloon either straight to the front or rear, or directly downward may be obtained. Thus it will be obvious that great flexibility of operation is an inherent feature of the present invention.

Figure 9:
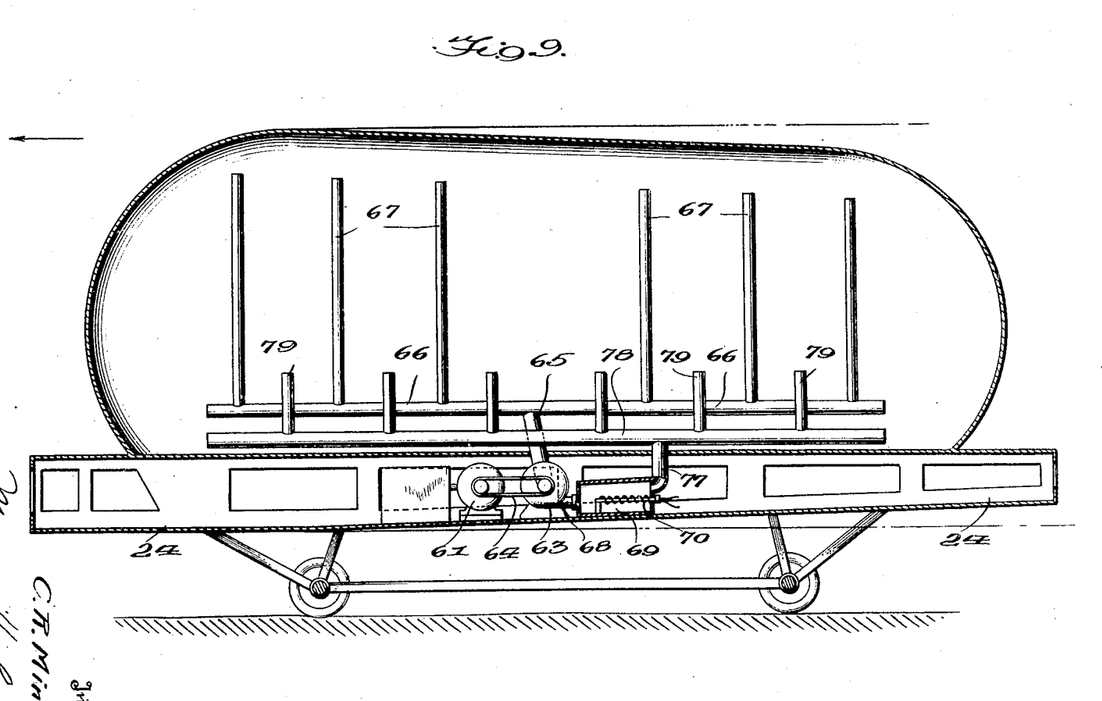
Fig. 9 is a longitudinal sectional view illustrating the means for producing circulation of gases and means for heating such gases. These features are shown in combination with the other features of the invention in Fig. 1, but in Fig. 9 only the heating and circulating device is illustrated, the other features having been removed for the purpose of clarity.

In Fig. 9 the further means for controlling the elevation of the balloon is illustrated. This means may be employed either in connection with the other features already described or may be employed independently thereof. The principle of operation involved in this improvement is the regulation of the temperature of the gases within the balloon by providing a heater so located that the gases may be circulated through the heater and in contact with the heating element or elements thereof. As shown, the reference numeral 61 denotes a motor which, as indicated in Fig. 3, may likewise be connected with the source of electrical energy or prime mover 23, and controlled by the switch 62 within the cabin. The motor 61 drives a fan 63 by means of a belt 64, the fan being provided with an intake pipe 65 which connects with a longitudinally extending manifold 66 having branches 67 extending to the upper portion of the gas bag, by means of which gas is drawn by suction into and through the fan 63 and discharged through the fan outlet 68 into a heating chamber 69 in which is located an electrical heating unit 70. The electrical heating unit may be suitably controlled by a switch or rheostat so as to regulate the degree of heating of the gases passing through the chamber 69. Electrical heating means are preferred, but other means might be employed. From the heater 69 the gases pass through pipe 77 into a second manifold 78 having branches 79 which are shorter than the branches 67 extending from the manifold 66. By this means hot gases are delivered into the lower portion of the balloon, which, due to their lightness, rise to the upper portion thus producing a complete circulation and insuring substantially uniform temperature conditions throughout the balloon. By regulating the degree of heating of these gases, the elevation of the balloon may be controlled as desired within limits.

Figures 10, 11, 12:
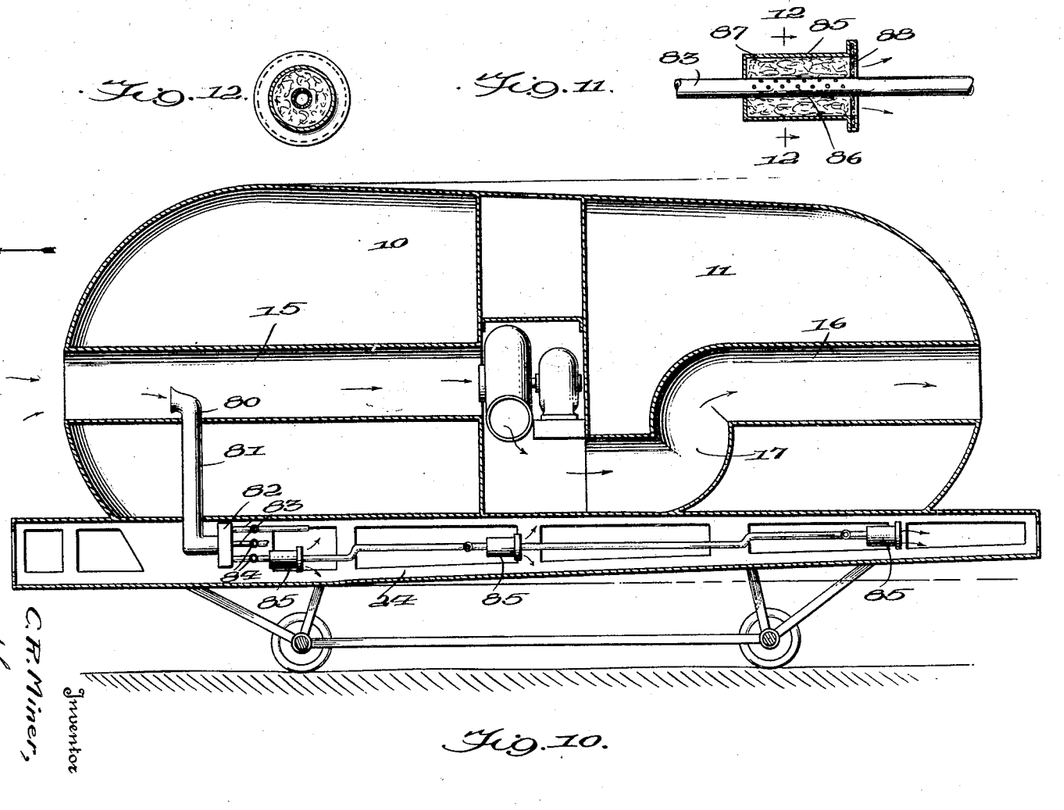
Fig. 10 is a longitudinal sectional view intended to illustrate the method of withdrawing air under pressure from the central longitudinal tube, and showing individual means for delivering such compressed air at various points in the cabin.
Fig. 11 is a detail longitudinal sectional view on an enlarged scale, showing one of the individual air delivering means illustrated in Fig. 10.
Fig. 12 is a transverse sectional view on line 12—12 of Fig. 11.

In Fig. 10, means are shown for withdrawing air passing through the central tube 15 and delivering the same through branched pipes to any desired location where such air is required. As shown, such means comprises a funnel 80 facing in the normal direction of movement of the balloon, which direction is indicated by the upper arrow in the figure, while the direction of movement of the air in the opposite direction is indicated by the lower set of arrows.

Thus it will be evident that, when the balloon is in motion air will be forced through the funnel 80, thence downwardly through pipe 81 into manifold 82. From the manifold 82, three smaller branches 83 controlled by valves 84 extend. Any number of such pipes may be employed, and the air so obtained may be used for any desired purpose. For example, that from the lowest pipe may be used for breathing purposes, that from the second pipe may be used for the supplying of air to internal combustion engines, and that from the upper pipe may be used for operating fans on the shafts of which are dynamos for producing auxiliary electrical power. As shown, the lowest pipe 83 is provided with a plurality of air delivery means 85, here shown as three in number, through which air may be supplied to the three compartments into which the cabin 24 is divided. The details of these delivery devices are shown in Figs. 11 and 12. It will be noted that the pipe 83 is suitably perforated at 86 to permit a portion of the air to enter the air delivery member. Mineral wool 87 surrounds the exterior of pipe 83, and at the forward end of the air delivery device there is provided a screen 88 through which fresh air passes into the cabin where it is desired for breathing purposes.

Figure 13:
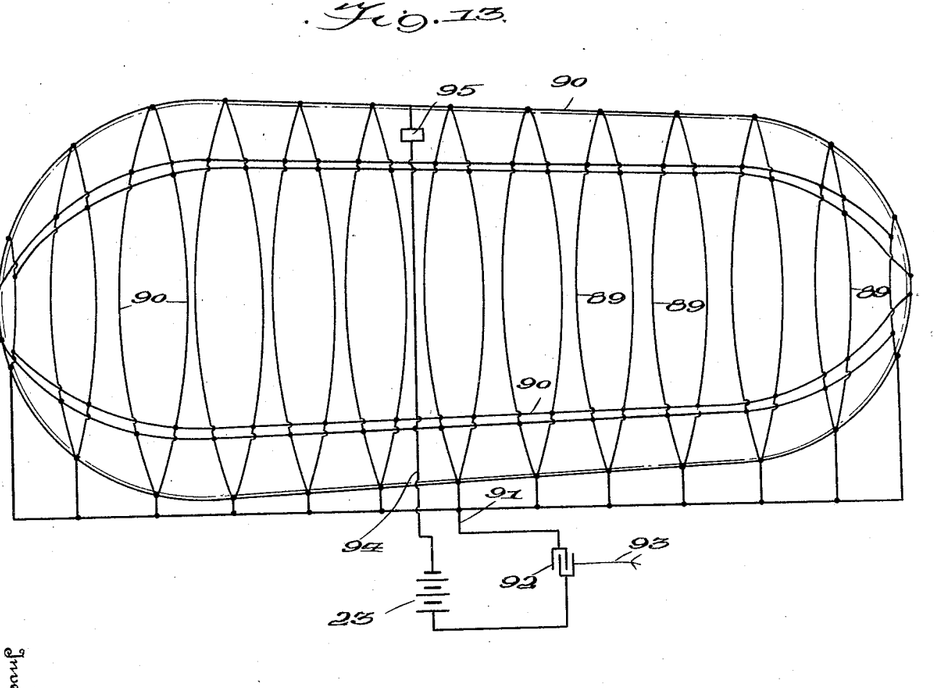
Fig. 13 is a diagrammatic view showing the wiring surrounding the balloon for protecting against lightning or static electricity.

In Fig. 13 there is shown means for protecting the balloon, and particularly the electrical equipment thereof, against lightning or the accumulation of static electricity. As shown, the entire balloon is surrounded by a network of wires, including vertical wires 89 arranged at suitable intervals along the length of the balloon, and connected to other wires 90 extending longitudinally of the balloon and crossing the wires 89 at substantially right angles thereto. The network is connected by means of a wire 91 leading preferably from the bottom thereof to a suitable condenser 92, from which electricity may be slowly dissipated to a grounding means 93 to the atmosphere. As a further protection, the source of electrical energy and other electrical equipment generally indicated by the numeral 23 may be connected by wire 94 through a fuse 95 to the protecting wire framework. The fuse is designed to be blown in case of an excessive charge of electricity, thus protecting the electrical equipment 23 against injury. The whole wire framework protects all parts of the balloon and cabin against injury by electricity of any character, the condenser 92 serving to slowly dissipate excessive charges to the air.

The invention has been described in detail for the purpose of illustration, but it will be obvious that it is not to be limited to such details.

What I claim is:

1. In an aerial navigation machine of the lighter-than-air type, having a tubular passage extending lengthwise of the machine, with means for producing rapid movement of air through said tubular passage, in combination, a by-pass communicating with said central passage for withdrawing a limited quantity of air therefrom, a manifold in communication with said by-pass, individual pipes leading from said manifold to a place of use for said air, and valves for controlling said individual pipes.

2. In an aerial navigation machine of the lighter-than-air type, having a tubular passage extending lengthwise of the machine, with means for producing rapid movement of air through said tubular passage, in combination, a by-pass communicating with said central passage for withdrawing a limited quantity of air therefrom, a manifold in communication with said by-pass, individual pipes leading from said manifold to a place of use for said air, valves for controlling said individual pipes, and air distributing devices located at intervals along one of said individual pipes.

3. In an aerial navigation machine of the lighter-than-air type, having a tubular passage extending lengthwise of the machine, with means for producing rapid movement of air through said tubular passage, in combination, a by-pass communicating with said central passage for withdrawing a limited quantity of air therefrom, a manifold in communication with said by-pass, individual pipes leading from said manifold to a place of use for said air, valves for controlling said individual pipes, and air distributing devices located at intervals along one of said individual pipes, the pipe being apertured at each distributing device and each such distributing device comprising a casing opening in one direction and surrounding the pipe, and mineral wool interposed between the pipe and the casing.

4. In combination with a balloon having a tubular central passage opening at the ends of the balloon, and box rudders at each of said ends, each rudder comprising a sleeve extending beyond the tubular passage and rotatable with reference thereto, a collar surrounding said sleeve and pivoted thereto about a vertical axis, means for rotating said sleeve and means for swinging said collar about its pivot.

5. In combination with a balloon having a tubular central passage opening at the ends of the balloon, box rudders at each of said ends, each rudder comprising a sleeve extending beyond the tubular passage and rotatably connected thereto, and a collar surrounding said sleeve, spaced therefrom, and pivotally connected thereto.

6. In combination with a balloon having a tubular central passage opening at the ends of the balloon, box rudders at each of said ends, each rudder comprising a sleeve extending beyond the tubular passage and rotatably connected thereto, a ring gear on said sleeve, means coacting with the ring gear for rotating the sleeve, a collar surrounding said sleeve and pivoted thereto, and means for swinging said collar about its pivot.

7. A dirigible balloon having a tubular passage extending from end to end thereof, selectively operable means located within the passage for producing a draft in either direction, air being drawn in at either end of the passage, and discharged at the opposite end, whereby movement of the balloon in a forward or rearward direction may be attained, and universally movable box rudders, one at each end of the passage, the rudder at the air intake end being operated in each instance, and the rudder at the exit end being retained in substantially fixed position.

In testimony whereof I affix my signature.

CHARLES R. MINER.